(12) United States Patent
McBee

(10) Patent No.: US 8,562,213 B1
(45) Date of Patent: Oct. 22, 2013

(54) VENTILATED WILD GAME CARCASS BAG

(76) Inventor: Krystal McBee, Peyton, CO (US)

( * ) Notice: Subject to any disclaimer, the term of this patent is extended or adjusted under 35 U.S.C. 154(b) by 748 days.

(21) Appl. No.: 12/321,313

(22) Filed: Jan. 16, 2009

(51) Int. Cl.
*B65D 33/16* (2006.01)

(52) U.S. Cl.
USPC .............................................. 383/71; 383/7

(58) Field of Classification Search
USPC ...................... 383/7, 71, 72, 75, 76
See application file for complete search history.

(56) References Cited

U.S. PATENT DOCUMENTS

| | | | | |
|---|---|---|---|---|
| 1,725,864 A * | 8/1929 | James | ............... | 43/55 |
| 2,208,861 A * | 7/1940 | Smith | ............... | 43/56 |
| 2,323,318 A * | 7/1943 | Farkas | ............... | 43/55 |
| 2,518,651 A * | 8/1950 | Weiss et al. | ............ | 62/371 |
| 2,679,960 A * | 6/1954 | Lowe | ............... | 224/616 |
| 2,682,290 A * | 6/1954 | Ditlea | ............... | 383/121 |
| 2,756,912 A * | 7/1956 | Armstrong | ............ | 224/603 |
| 2,795,889 A * | 6/1957 | Garland | ............ | 43/55 |
| 3,025,629 A * | 3/1962 | Sears | ............... | 43/55 |
| 3,074,074 A * | 1/1963 | Lovering | ............ | 2/94 |
| 3,150,640 A * | 9/1964 | Nevitt | ............... | 119/712 |
| 3,674,188 A | 7/1972 | Anderson | | |
| 3,777,498 A * | 12/1973 | Andrews et al. | ........ | 405/185 |
| 3,988,853 A * | 11/1976 | Hudkins | ............ | 43/55 |
| 4,137,870 A * | 2/1979 | Cano | ............... | 119/712 |
| 4,197,890 A * | 4/1980 | Simko | ............... | 383/97 |
| 4,301,920 A | 11/1981 | Boggs | | |
| D269,224 S | 6/1983 | Church | | |
| 4,498,190 A * | 2/1985 | Garlick, III | ............ | 383/28 |
| D278,389 S | 4/1985 | Kircher et al. | | |
| 4,713,033 A | 12/1987 | Cameron | | |
| 4,775,082 A * | 10/1988 | Krache | ........ | 224/219 |
| 4,785,766 A * | 11/1988 | Blalock, Jr. | ........ | 119/453 |
| 4,796,567 A * | 1/1989 | Allan et al. | ........ | 119/678 |
| 4,884,732 A * | 12/1989 | Sunderland | ........ | 224/666 |
| 4,887,823 A | 12/1989 | Hallett et al. | | |
| 4,949,842 A * | 8/1990 | Mokiao, II | ........ | 206/286 |
| 4,980,988 A * | 1/1991 | Whitman | ........ | 43/54.1 |
| 4,989,995 A * | 2/1991 | Rubenstein et al. | ........ | 383/117 |
| 5,230,304 A * | 7/1993 | Santoro | ........ | 119/751 |
| 5,336,124 A * | 8/1994 | Garside | ........ | 452/125 |
| D356,948 S | 4/1995 | Nahatchewitz | | |
| 5,467,734 A * | 11/1995 | Ho | ........ | 119/497 |
| 5,467,907 A | 11/1995 | Celik | | |
| 5,761,992 A | 6/1998 | Gallo | | |
| D424,254 S * | 5/2000 | Rooney | ........ | D30/151 |
| 6,253,569 B1 * | 7/2001 | Hall | ........ | 62/457.2 |
| 6,276,698 B1 | 8/2001 | Calandra | | |
| 6,394,039 B1 * | 5/2002 | Grauer | ........ | 119/712 |
| 6,508,077 B1 | 1/2003 | Vander Boegh et al. | | |

(Continued)

*Primary Examiner* — Justin Larson
*Assistant Examiner* — Peter Helvey
(74) *Attorney, Agent, or Firm* — Montgomery Patent & Design; Robert C. Montgomery

(57) ABSTRACT

A game bag with enhanced features is herein disclosed, comprising a lower portion of the bag provided with open-screened netting which allows for increased airflow over the carcass thus allowing the carcass to cool in a controlled manner, and an upper portion of the bag provided with sections of hook-and-loop fastener. One section of hook-and-loop fastener is provided in a vertical configuration which allows the bag to open up fully across its upper section. Another section is provided horizontally on a strap arrangement to allow for complete sealing of the bag against the carcass. To properly use the game bag, the game is field dressed and hung from a tree or other suitable support. Next, the bag is brought up from the bottom to completely cover the carcass thus sealing it from dirt, insects and other contaminates.

12 Claims, 7 Drawing Sheets

(56) References Cited

U.S. PATENT DOCUMENTS

| | | | |
|---|---|---|---|
| 6,520,120 B1 * | 2/2003 | Arnold et al. | 119/850 |
| 6,575,626 B1 | 6/2003 | Gillespie, Jr. et al. | |
| 6,889,882 B1 * | 5/2005 | Leep | 224/579 |
| 7,338,210 B1 * | 3/2008 | Fultz et al. | 383/16 |
| 7,832,743 B2 * | 11/2010 | Small | 280/19 |
| 7,954,503 B2 * | 6/2011 | Glass | 135/95 |
| 2001/0019638 A1 * | 9/2001 | Fox et al. | 383/75 |
| 2006/0171606 A1 * | 8/2006 | Valentine | 383/4 |

* cited by examiner

* # VENTILATED WILD GAME CARCASS BAG

RELATED APPLICATIONS

The present invention was first described in a notarized Official Record of Invention on Aug. 30, 2007, that is on file at the offices of Montgomery Patent and Design, LLC, the entire disclosures of which are incorporated herein by reference.

FIELD OF THE INVENTION

The present invention relates generally to a game carcass bag and, more particularly, to said game carcass bag comprising a lower portion provided with open-screened netting which allows for increased airflow over an animal carcass thus allowing the carcass to cool in a controlled manner, and an upper portion provided with a plurality of straps allowing for complete sealing of the bag against the carcass.

BACKGROUND OF THE INVENTION

Hunters must field dress recently harvested game to prevent spoilage of the meat. One important aspect of field dressing is that the game must be permitted to cool and dry out in that ambient air and at the same time be protected from insects, birds, dirt and other contaminants. To help in this regard, many hunters turn to cheesecloth game bags, which do an adequate job of shielding the game; however the meat does not get an adequate airflow which leads to spoilage, rotting and other problems. Accordingly, there exists a need for a means by which game which has been field dressed can be protected from insects, birds, dirt and other items while still being afforded an adequate air flow. The development of the invention described herein fulfills this need.

Hunters traditionally use cheesecloth or knit game bags to protect recently harvested game. Neither product is entirely satisfactory for use alone. In combining these two (2) components together in one bag, hunters will have an effective means of providing adequate ventilation to meat to inhibit spoilage and protection from insects and dirt.

There have been attempts in the past to provide carcass game bags. U.S. Pat. No. 6,575,626 issued to Gillespie et al discloses a bag like structure that is utilized to store hunting gear while in the field. Unfortunately, this patent does not appear to disclose a ventilated wild game carcass bag comprising open netting and straps that serves to protect recently harvested wild game.

U.S. Pat. No. 6,508,077 issued to Vander Boegh discloses a bag that comprises an inner and outer layer with a layer of heat resistant insulation contained therein that encircle and preserve recently harvested game. Unfortunately, this patent does not appear to disclose a ventilated wild game carcass bag comprising open netting and straps that serves to protect recently harvested wild game that is supported in a tree or other structure.

U.S. Pat. No. 6,276,698 issued to Calandra discloses a collapsible game frame that is attachable to a motor vehicle to transport game from the field. Unfortunately, this patent does not appear to disclose a ventilated wild game carcass bag comprising open netting and straps that serves to protect recently harvested wild game.

U.S. Pat. No. 5,761,992 issued to Gallo discloses a portable animal storage unit. Unfortunately, this patent does not appear to disclose a ventilated wild game carcass bag comprising open netting and straps that serves to protect recently harvested wild game that is supported in a tree or other structure.

U.S. Pat. No. 5,467,907 issued to Celik discloses a game pack for transporting a recently harvested turkey carcass. Unfortunately, this patent does not appear to disclose a ventilated wild game carcass bag comprising open netting and straps that serves to protect recently harvested wild game that is supported in a tree or other structure.

U.S. Pat. No. D 356,948 issued to Nabatchewitz discloses a game bag with a pull type closure at the top surface. Unfortunately, this design patent does not appear to disclose a game bag similar in appearance to the disclosed invention, nor does it appear to comprise open netting or strap features.

U.S. Pat. No. 4,887,823 issued to Hallett et al discloses an apparatus that may be placed around a carcass to assist in dragging a carcass from the field. Unfortunately, this patent does not appear to disclose a ventilated wild game carcass bag comprising open netting and straps that serves to protect recently harvested wild game.

U.S. Pat. No. 4,713,033 issued to Cameron discloses a bag that is utilized in throwing line. Unfortunately, this patent does not appear to disclose a ventilated wild game carcass bag.

U.S. Pat. No. D 278,389 issued to Kircher et al discloses a combined creel and game bag that appears to be capable of being maintained on one's belt while hunting or fishing. Unfortunately, this design patent does not appear to disclose a game bag similar in appearance to the disclosed device, nor does it appear to be capable of enveloping a wild game carcass supported on a tree or the like.

U.S. Pat. No. D 269,224 issued to Church discloses a diver's bag that appears to be a bag like structure with netting that is supported by a handle. Unfortunately, this design patent does not appear to disclose a game bag similar in appearance to the disclosed device, nor does it appear to be capable of enveloping a wild game carcass supported on a tree or the like.

U.S. Pat. No. 4,301,920 issued to Boggs discloses a preserving device comprising a layered insulated sheathing that enclosed a fish placed on ice therein. Unfortunately, this patent does not appear to disclose a ventilated wild game carcass bag comprising open netting and straps that serves to protect recently harvested wild game that is supported in a tree or other structure.

U.S. Pat. No. 3,674,188 issued to Anderson discloses a handheld fish and game receptacle. Unfortunately, this patent does not appear to disclose a ventilated wild game carcass bag that envelopes a carcass hanging from a support structure to provide protection thereto said carcass, nor does it appear to comprise open netting to permit airflow through the bag.

None of the prior art particularly describes a game carcass bag comprising a lower portion provided with open-screened netting which allows for increased airflow over an animal carcass thus allowing the carcass to cool in a controlled manner, and an upper portion provided with a plurality of straps allowing for complete sealing of the bag against the carcass that the instant device possesses. Accordingly, there exists a need for a means by which game which has been field dressed can be protected from insects, birds, dirt and other items while still being afforded an adequate air flow that operates without the disadvantages as described above.

SUMMARY OF THE INVENTION

In light of the disadvantages as described above in the prior art, it is apparent that there is a need for a portable device that incorporates the functionalities of a game bag with multiple enhancements designed to increase the level of protection of a carcass residing therein.

An object of the ventilated wild game carcass bag is a game bag with enhanced features such an open netted screen section on the rear panel and a bottom panel which allows for increased airflow over the carcass permitting the carcass to cool in a controlled manner with the increased protection from insects, dirt, animals, and/or other undesirable objects.

Another object of the ventilated wild game carcass bag comprises such a bag fabricated of textile or water-resistive heavy canvas or other suitable material that is designed to withstand environmental effects.

A further object of the ventilated wild game carcass bag comprises a lower portion that is fabricated of an open netting material to permit air flow through the bag while prohibiting access to insects, dirt, and/or other undesirables.

Still another object of the ventilated wild game carcass bag comprises a foldable or a collapsible means for easy storage.

Another object of the ventilated wild game carcass bag provides open screen netting that permits airflow to cool the carcass as well as to disperse any foul smell that may arise.

Still a further object of the ventilated wild game carcass bag includes straps, binding, fasteners, and the like that are affixed to the bag.

Yet another object of the ventilated wild game carcass bag provides a variety of colors and/or designs such as colors and/or designs that would correspond with the outside, i.e. camouflage.

Yet a further object of the ventilated wild game carcass bag comprises a variety of sizes to accommodate game carcasses and/or aquatic species of various size, shape, and species.

Yet still another object of the ventilated wild game carcass bag permits blood or the like to drain and collect at the bottom panel fabricated of open-screen netting.

Yet another object of the ventilated wild game carcass bag is a zippered attachment means that provides convenient access thereto an inner compartment.

A method of utilizing the device may be achieved by performing the following steps: tying the game carcass onto a support, i.e. a tree, via a rope, twine, string, or the like that is known in common practice; grasping the zipper member positioned on the front panel relatively central thereto; unzipping the zipper mechanism to open the main opening leading towards the main compartment; placing the apparatus around a game carcass supported via a tree or other support; enveloping said carcass with the ventilated wild game carcass bag; grasping the zipper member; closing the zipper mechanism in a normal manner; constricting the upper opening by wrapping the straps; engaging the hook-and-loop fasteners on the straps; and enjoying the protection afforded a recently harvested wild game carcass and the benefits of the ventilated wild game carcass bag.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
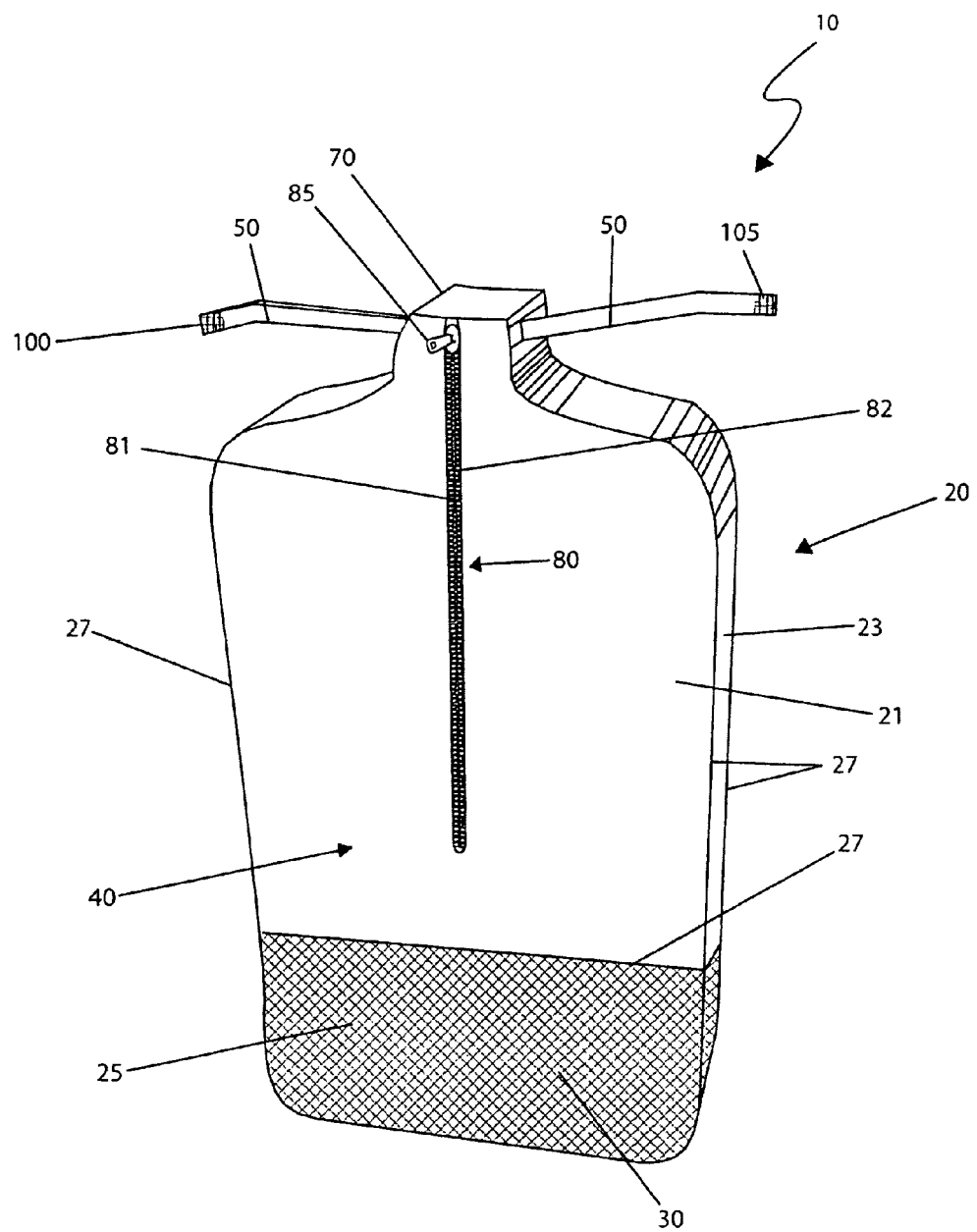
FIG. 1 is a perspective view of a ventilated wild game carcass bag 10, according to the preferred embodiment of the present invention.

DESCRIPTIVE KEY 10 ventilated wild game carcass bag
20 bag portion
21 front panel
22 rear panel
23 side panel
25 bottom panel
27 seam
30 open-netting screen section
40 outer face
45 inner face
50 strap
60 compartments
70 upper opening
80 zipper mechanism
81 male zipper track element
82 female zipper track element
85 zipper member
90 main opening
100 hook fastener strip
105 loop fastener strip

DETAILED DESCRIPTION OF THE PREFERRED EMBODIMENT

The best mode for carrying out the invention is presented in terms of its preferred embodiment, herein depicted within FIGS. 1 through 6. However, the invention is not limited to the described embodiment and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes an apparatus and method that discloses a portable device incorporating the functionalities of a game bag 20 with multiple enhancements designed to increase the level of protection of a carcass residing therein from dirt, insects, and other undesirable material from obtaining access thereto. The ventilated wild game carcass bag (herein described as the "apparatus") 10 comprises a ventilated bag 20 and a series of straps 50. It is envisioned that the apparatus 10 may be fabricated of a plurality of textiles; however, it is preferable that the apparatus 10 be fabricated of a water-resistive heavy canvas or other suitable material that is designed to withstand environmental effects. The lower portion of the bag 20 would be fabricated of an open netting material 30 with each opening approximately one-sixteenth (1/16) of an inch square to permit air therethrough while preventing access thereto insects, dirt, and/or other undesirables. The material utilized is envisioned to allow the apparatus 10 to be foldable or collapsible for easy storage means. The finishing touches such as, but not limited to, the straps 50, binding, fasteners, and the like would be sewn, adhered, integrated, or attached thereto. The apparatus 10 may be introduced in a variety of colors and/or designs such as colors and/or designs that would correspond with the outside, i.e. camouflage.

Figure 2:
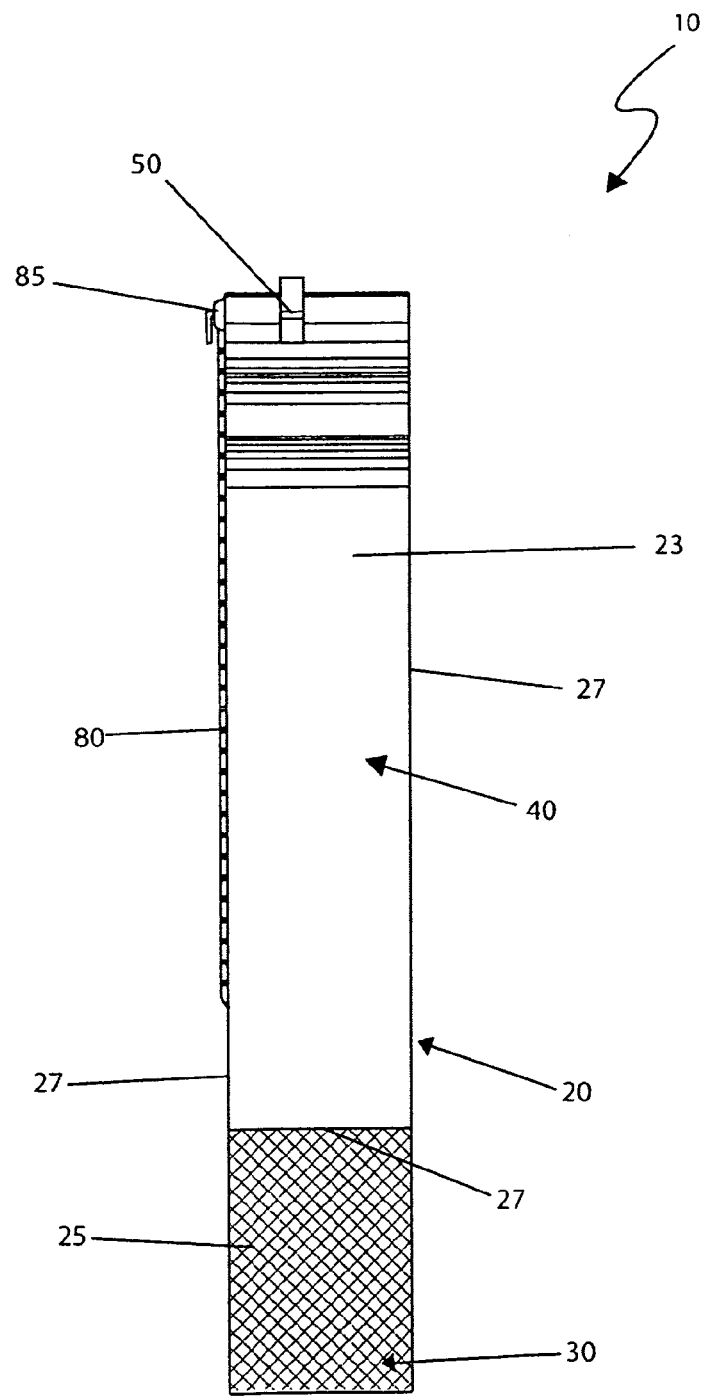
FIG. 2 is a side view of the ventilated wild game carcass bag 10, according to the preferred embodiment of the present invention.

Referring now to FIGS. 1 and 2, a perspective and side view of the apparatus 10, are herein disclosed according to the preferred embodiment of the present invention. The apparatus 10 is envisioned to comprise a bag portion 20 that comprises a front panel 21, a rear panel 22, side panels 23 and a base panel 25 that are interconnected by means of seams 27. However, alternate embodiments may disclose the bag portion 20 may be a unitary or substantially unitary piece of material. A seam 27, as described as being stitched, adhered, or otherwise integrated, interconnects the front 21 and rear 22 panel via the side panels 23 along the longitudinal sides of each panel 21, 22, 25 so that the left side edge of the front panel 21 is attached to the right side edge of the side panel 23 which in turn is attached to the right side edge of the rear panel 22 and the right side edge of the front panel 21 is attached to the left side edge of the opposing side panel 23 which in turn is attached to the left side edge of the rear panel 22. It will be appreciated that the designations of right and left are arbitrary and may be switched in accordance with the view chosen. Another seam 27 interconnects the front 21, rear 22, sides 23 and bottom panel 25 along the bottom lateral sides of said panels 21, 22, 23, 25 so that the upper edge of the bottom panel 25 is attached to the bottom edges of the front panel 21, side panels 23, and rear panel 22.

Figure 3A:
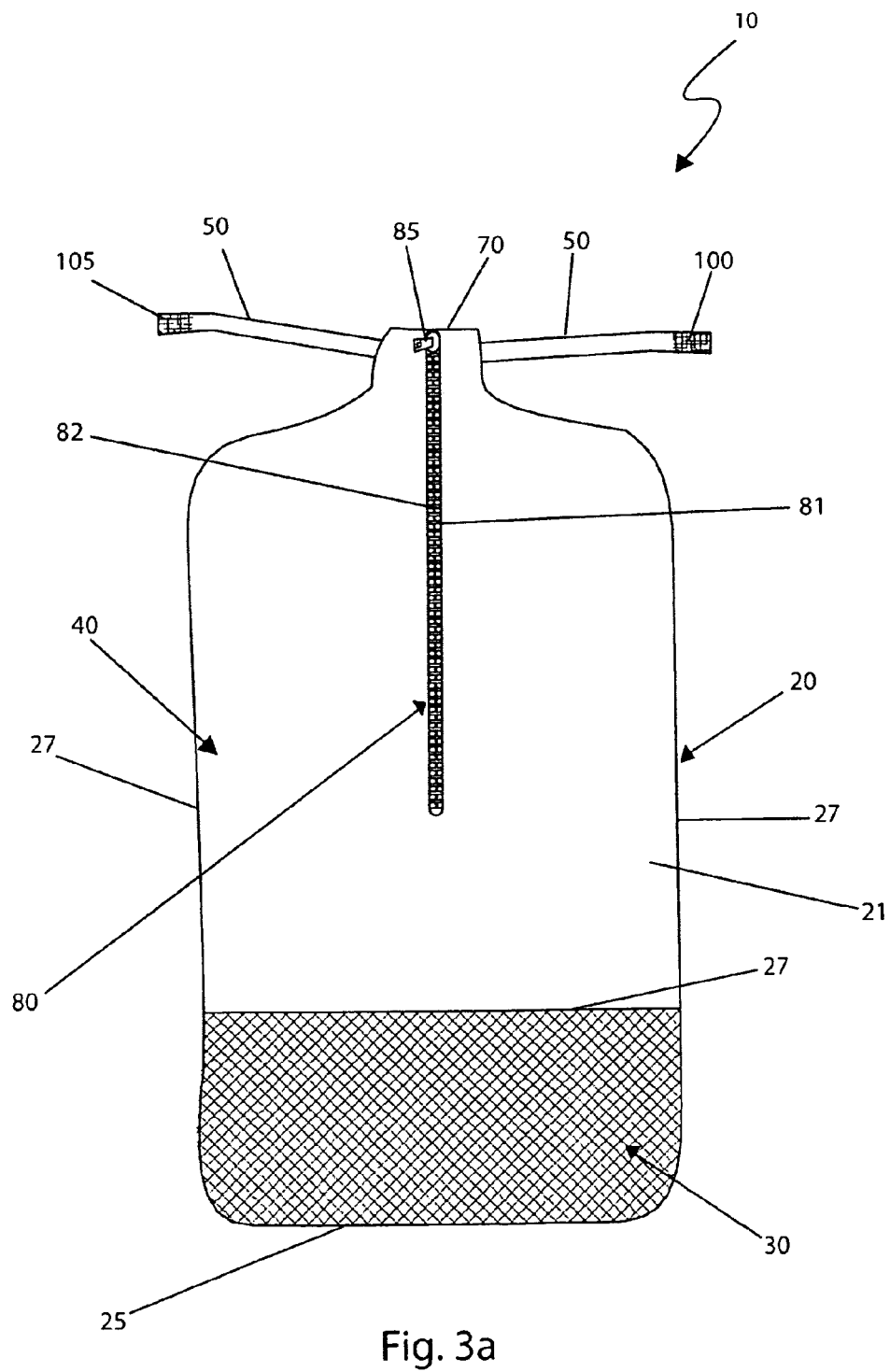
FIG. 3a is a front view of the ventilated wild game carcass bag 10 with a zipper mechanism 80 openly closed, according to the preferred embodiment of the present invention.
Figure 3B:
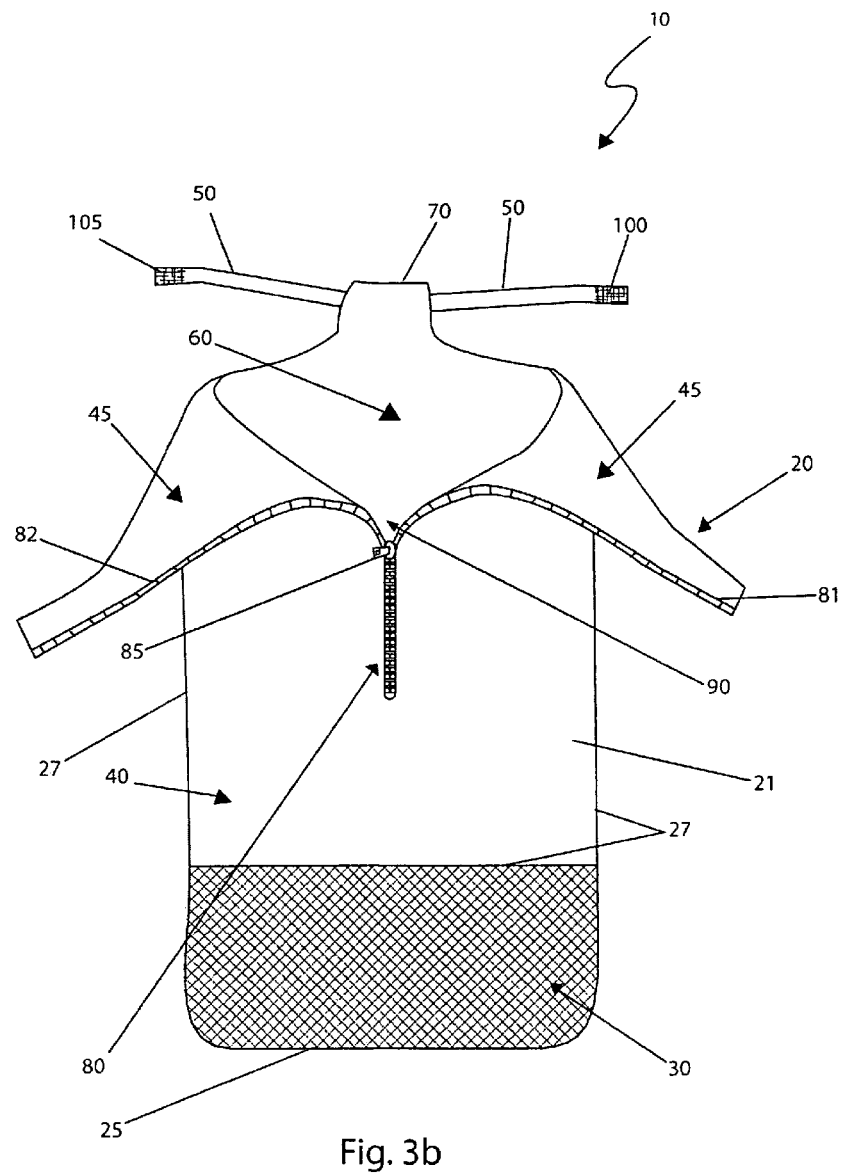
FIG. 3b is a front view of the ventilated wild game carcass bag 10 with the zipper mechanism 80 closably opened thereby exposing an inner compartment 60, according to the preferred embodiment of the present invention.

Referring now to FIGS. 3a and 3b, front views of the apparatus 10, are herein disclosed according to the preferred embodiment of the present invention. The bag 20 is envisioned to comprise two (2) connected faces, an outer face 40 and an inner face 45, with the outer face 40 being made of a water-resistive heavy canvas or other suitable material that is designed to withstand environmental effects and an inner face 45 fabricated of a washable material so that the blood and the like may be removed after utilization. The bag 20 is envisioned to be sized to accommodate game carcasses and/or aquatic species of various size, shape, and species, preferably having an overall inner compartment 60 dimensions of nine-and-a-half (9½) feet long and three (3) feet wide. The width of the bag 20 is the distance between the longitudinal edges whereas the seams 27 are located for connection of the rear 22 and front 21 panels via the side panels 23, and the length of the bag 20 is the distance between an upper opening 70 and the bottom-most edge of the bottom panel 25. However, the size of the apparatus 10 may be introduced in a plurality of dimensions suitable for receiving and enveloping one (1) or more carcasses and/or aquatic species of various species, sizes, and weights.

Figure 4:
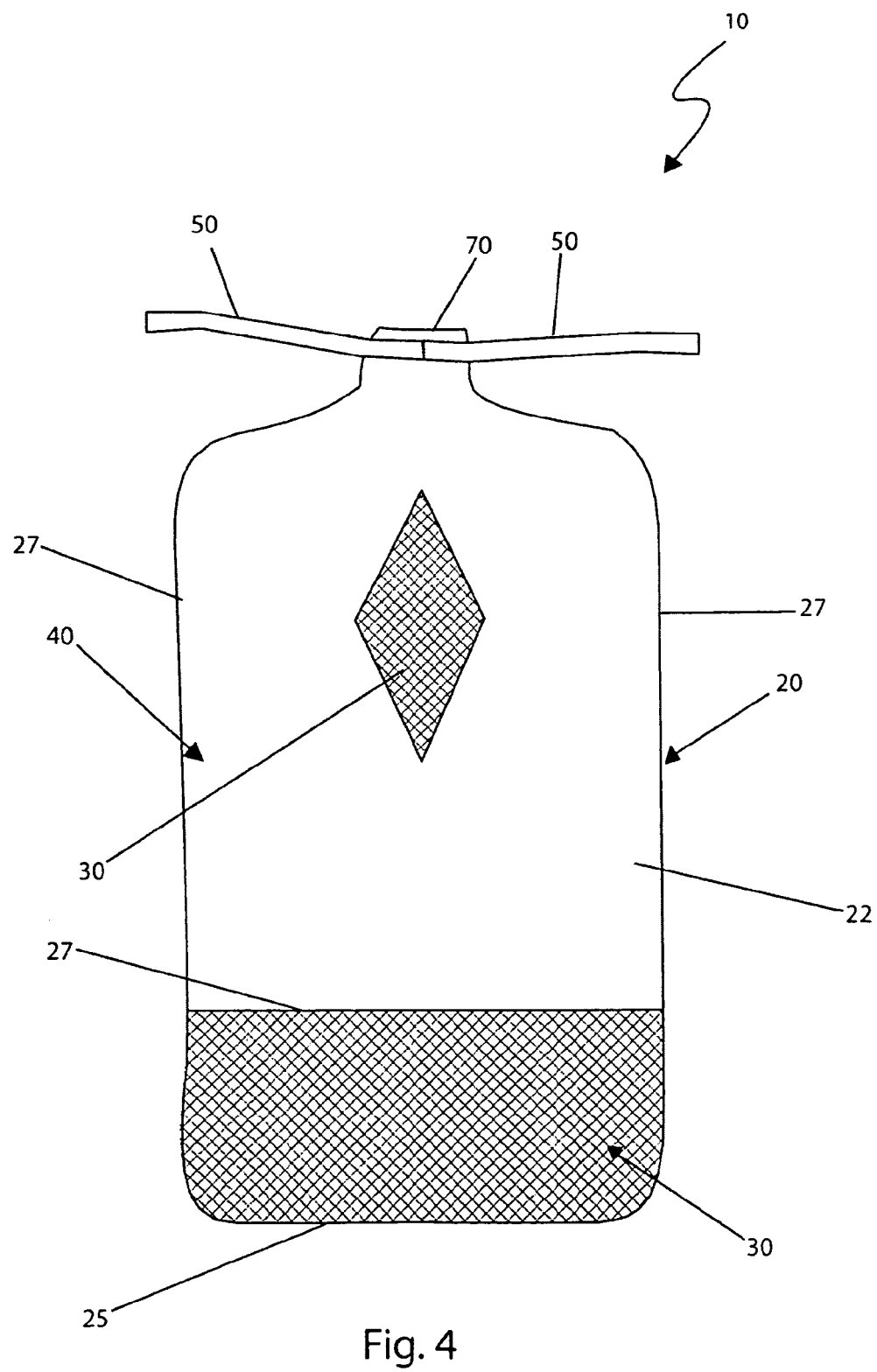
FIG. 4 is a rear view of the ventilated wild game carcass bag 10, according to the preferred embodiment of the present invention.

Referring now to FIG. 4, a rear view of the apparatus 10 is herein disclosed according to the preferred embodiment of the present invention. Positioned across the relative central position of the rear panel 22 is an open-screen netting portion 30 shaped much like a diamond sized about (1/5) of the total area of said rear panel 22. Let it be known, that the shape and size is for illustrative purposes only and may be of any size or shape without leaving the scope of the invention. The open screen netting portion 30 is envisioned to removably receive airflow therethrough to cool the carcass as well as to disperse any foul smell that may arise. The open-screen netting portion 30 is positioned ideally to present a means for providing airflow thereto the carcass in which said airflow may exit therethrough the bottom panel 25 that is made up mostly of the open-screen netting material 30. Let it be known, that the size and amount of coverage of the open-screen netting portion 30 on the bottom panel 25 is for illustrative purposes only and may be of any size and amount of coverage. The open-screen netting 30 comprises a series of longitudinal strands that span across the length of the periphery of the open-screen netting sections 30 crisscrossed via a series of transverse strands that span across the width of the periphery of the open-screen netting sections 30. Apertures formed therebetween the crisscross of the strands are not so large or shaped in which would allow dirt, insects, animals, and/or other undesirables from gaining access therein but large enough such as to permit airflow to pass therethrough.

Figure 5:
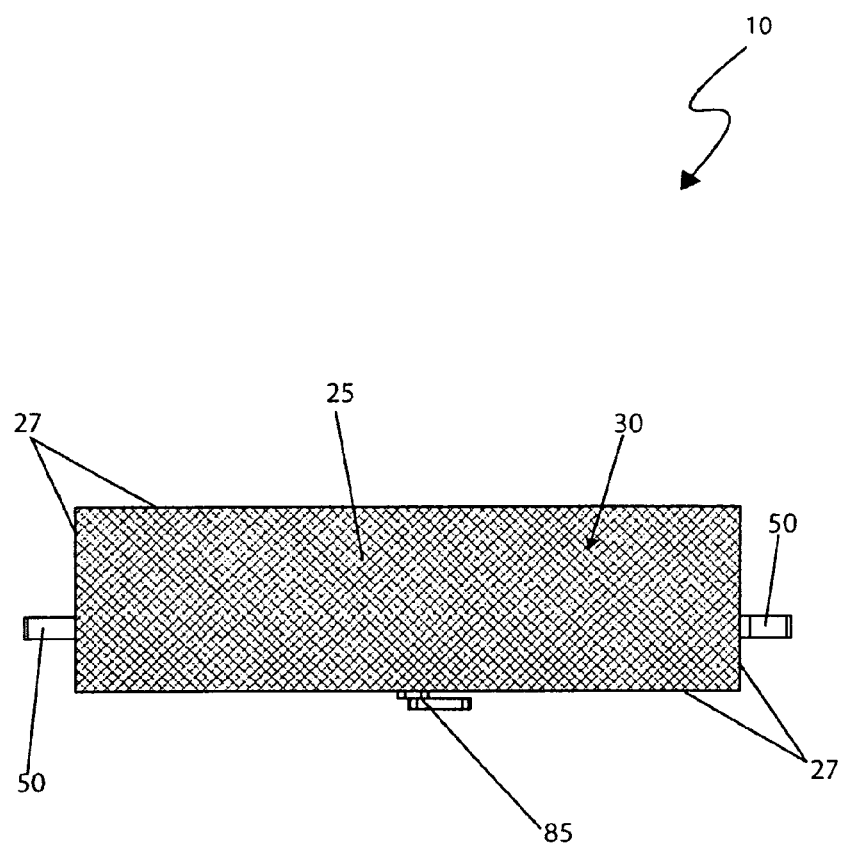
FIG. 5 is a bottom view of the ventilated wild game carcass bag 10, according to the preferred embodiment of the present invention; and, FIG. 6 is a top view of the ventilated wild game carcass bag 10, according to the preferred embodiment of the present invention.

Referring now to FIG. 5, a bottom view of the apparatus 10 is herein disclosed according to the preferred embodiment of the present invention. The blood or the like is envisioned to flow downwardly as a net result of gravity to collect at the bottom of the apparatus 10 in which is a bottom panel 25 fabricated of open-screen netting 30. The blood is thus released therethrough the perforations formed at the open-screen netting 30.

Figure 6:
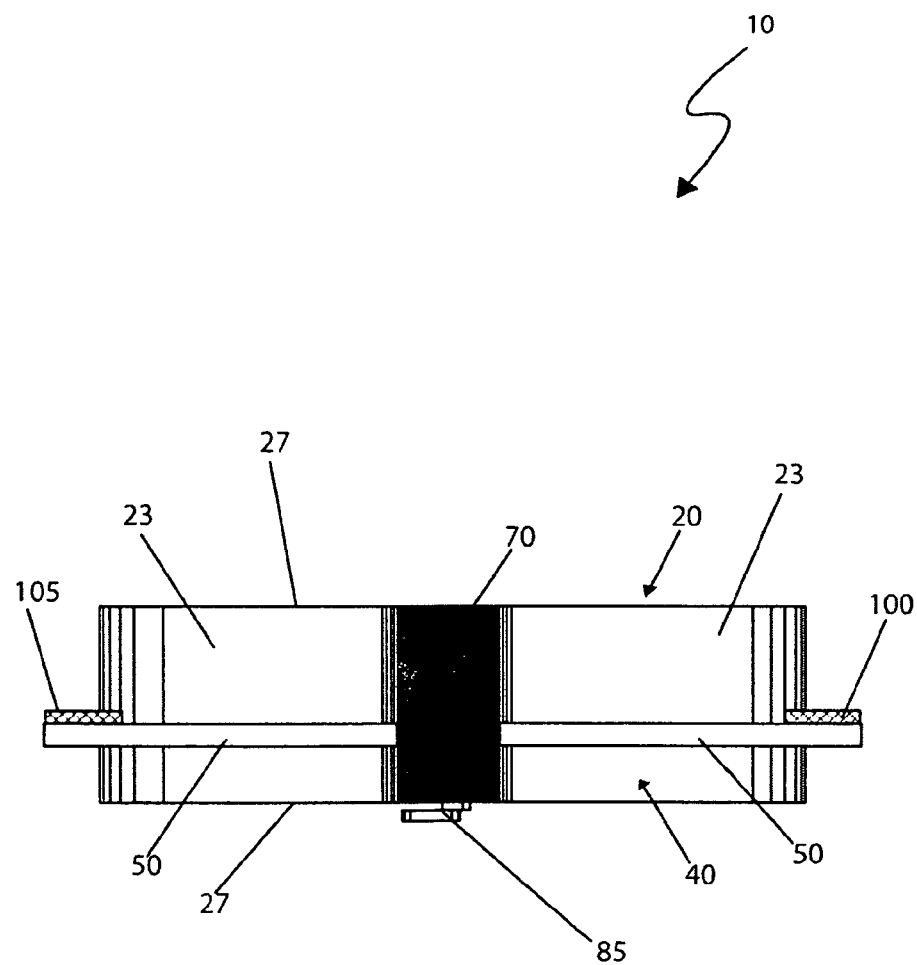

Referring now to FIGS. 2b and 6, views of the apparatus 10, are herein disclosed according to the preferred embodiment of the present invention. Spanning along the partial length of the front panel 21 resides a zipper mechanism 80 that initiates at an upper opening 70, integrally formed via the attachment of the front 21, side 23, and rear 22 panels. The zipper mechanism 80 is centrally and integrally residing that spans across the partial length of the front panel 21 to provide access therewithin the compartment 60. The zipper mechanism 80 comprises a male zipper track element 81 and a female zipper track element 82 that is utilized to selectably and openly secure a main opening 90 that leads towards the inner compartment 60 in which a game carcass or the like resides. The zipper mechanism 80 is envisioned to comprise a male zipper track element 81 with a zipper member 85 integrally attached thereon for gripping thereof, is envisioned to be installed along one (1) edge and opposes the female zipper track element 82 attached along an edge parallel to and directly adjacent to the male zipper track element 81 to be selectably and fixedly engaged thereto. The zipper member 85 engages the female zipper track element 82 upon receipt of motion from the user thereby engaging said female zipper track element 82 therewith the male zipper track element 81 along the span of the zipper mechanism 80 and, consequently, biasing the edges towards each other while traveling upwardly or releasing the edges away from each other while traveling downwardly thereby exposing the interior compartment 60 therein the bag 20. The male 81 and female 82 zipper elements are permanently stitched along first and second edges formed along the central position of the front panel 21, respectively. The zipper mechanism 80 provides access thereto the compartment 60 via an opening 90 which expands the upper opening 70 that can be openly closed via said zipper mechanism 80 thereby contracting the upper opening 70 to its original state. The compartment 60 is capable of enveloping a game carcass or the like for prevention of insects, dirt, and animals from gaining access thereto. Let it be known that alternate fastening methods may be utilized without leaving the scope of the invention such as, but not limited to: buttons, buckles, snaps, hook-and-loop fasteners, or other fasteners to be utilized for access and closing of the main opening 90.

Straps 50 are is envisioned to be fabricated of the same material as the bag portion 20, comprising one (1) end stitched thereto the upper edge periphery of the upper opening 70, having another end free of movement such to allow said straps 50 to motion, as needed. The straps 50, envisioned to be a plurality of length, width, and/or other dimensions, may be utilized whenever the apparatus 10 is installed thereupon the game carcass for constricting the upper opening 70 thereby biasing the periphery of said upper opening 70 to fully surround a rope, twine, or the like that is tied thereto the carcass and the support, i.e. tree. The weight of the game carcass is envisioned to be applied thereto a tree or other supporting member so that the apparatus 10 may be installed thereupon thereby enveloping said game carcass. Alternate fastening methods may be utilized without leaving the scope of the invention such as, but not limited to: zippers, buttons, buckles, snaps, hook-and-loop fasteners, or other fasteners to be utilized to constrict the upper opening 70.

A hook-and-loop fastener assembly 100, 105 is mounted on the exterior surface of the straps 50 for allowing the securement of said straps 50 thereby temporarily constricting the upper opening 70 of the apparatus 10. The hook-and-loop fastener 100, 105 assembly comprises a hook fastener strip 100 and a loop fastener strip 105 which mate one (1) with the other. The hook fastener strip 100 is envisioned to be positioned on the distal end of one (1) strap 50 to attach to the loop fastener strip 105 positioned at the distal end of the other strap 50. The hook fastener strip 100 operably fastens to the loop fastener strip 105 positioned on the distal end of the strap 50, wherein the distal end is a description of the end which is the furthest from the attached edge of the strap 50. The straps 50 are envisioned to encircle the upper opening 70 and the hook fastener strip 100 engages the loop fastener strip 105 thereby encompassing said upper opening 70. The hook-and-loop fastener assembly 100, 105 is sewn, integrated, or otherwise attached thereto the straps 50. Alternate fastening means may also be used such as, but not limited to, buttons, snaps, zippers, or the like without leaving the scope of the invention.

An alternate embodiment of the present invention may disclose a means at which the apparatus 10 may be utilized advantageously for other purposes, such as storing other food items or other items in which require airflow to stay fresh.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. The apparatus 10 is envisioned to be utilized for preserving and protecting game animals such as, but not limited to: deer, elk, moose, and the like. It will be appreciated that the apparatus 10 may also be used on aquatic species, i.e. fish.

The method of utilizing the device may be achieved by performing the following steps: tying the game carcass onto a support, i.e. a tree, via a rope, twine, string, or the like that is known in common practice; grasping the zipper member 85 operably positioned thereon the front panel 21 relatively central thereto; unzipping the zipper mechanism 80 to operably open the main opening 90 leading towards the main compartment 60; placing the apparatus 10 around the game carcass onto which is already supported via a tree or other support; enveloping said carcass via the apparatus 10; grasping the zipper member 85; zipping the zipper mechanism 80 to engage the male zipper portion 81 therewith the female zipper portion 82; constricting the upper opening 70 via wrapping the straps 50, thereby encircling said upper opening 70; and, engaging the hook fastener strip 100 therewith the loop fastener strip 105.

To properly use the apparatus 10, the game is field dressed and hung from a tree or other suitable support, as is common in practice. This is done to allow the bodily fluids to run out of the carcass and to allow the carcass to cool. Next, the apparatus 10 is placed around the carcass via the main opening 90 in which grants access therein the compartment 60. The main opening 90 may be openly closed to completely cover the carcass thus sealing it from dirt, insects, animals, and/or other undesirable objects. The apparatus 10 is envisioned to take the form of a game bag 20 with enhanced features such as comprising a section on the rear panel 22 and a bottom panel 25 comprising open-screened netting 30 which allows for increased airflow over the carcass thus allowing the carcass to cool in a controlled manner with the increased protection from insects, dirt, animals, and/or other undesirable objects. Further, the bottom panel 25, in which is fabricated of an open-screen netting 30, serves to form a means in which will enable the blood and/or other fluids from the game carcass to run therethrough. Let it be known that the apparatus 10 may also be utilized for aquatic species in combination with or instead of animal carcasses.

The apparatus 10 is envisioned to be constructed of one (1) or more pieces of strong, lightweight, washable, and resilient material. The outer layer 40 is envisioned to be capable of withstanding environmental effects while the inside layer 45 is envisioned to be easily washable so that the blood may be removed therefrom. The apparatus 10 comprises a bag portion 20 that can be conveniently placed over thereby enveloping a game carcass or one (1) or more aquatic species in a controlled airflow environment. The bag 20 is sized to permit a game carcass, fish, or the like to be enveloped and received therein a main compartment 60 of said bag 20 via a main opening 90 that has gained access therein via the zipper mechanism 80. To provide access to the internal compartment 60 defined within the apparatus 10, a main opening 90 that can be selectively opened and closed through the use of a zipper mechanism 80. The edges of the main opening 90 which may be detached utilizing a zipper member 85 to slidingly pull along the male 81 and female 82 track elements until said edges detaches thereby providing access therein the main compartment 60. The game carcass, fish, or the like is removably inserted therein the bag portion 20 and secured therein via the zipper mechanism 80 that centrally spans across the front panel 21 thereof. The utilization of the zipper mechanism 80 further ensures that the game carcass, fish, or the like remains protected within the main compartment 60 when said carcass, fish, or the like is being hung via support. The side edges of the main opening 90 are biased close together whenever the zipper member 85 is motioned upwardly such that the carcass, fish, or the like is secured within the main compartment 60.

A rope, twine, or the like is envisioned to support the weight of the carcass, as is common practice. In this manner, it should be realized that the entire weight of the animal carcass will be placed thereon a support, i.e. a tree. Therefore, it will be understood that the apparatus 10 does not bear the weight of the carcass. Because the zipper mechanism 85 initiates from the upper edge of the upper opening 70, the carcass may be tied thereupon the tree or other support initially. Then the zipper mechanism 80 may then be utilized to create an opening 90 to gain access thereto a compartment 60 therein the apparatus 10. The zipper mechanism 80 may then be used to close the opening 90 traveling thereto the uppermost point, the initiation point. The straps 50 are then utilized to constrict the upper opening 70 around the support rope, twine, or the like.

Accordingly, each strap 50 is in a spaced vertical relation with respect to each other, and individually and linearly aligned along the peripheral surface of the upper opening 70. The straps 50 constrict the entire periphery of the upper opening 70 to form a tight seal about said upper opening 70 prevent access therein to insects, dirt, animals, and/or other undesirable objects. The straps 50 are provided with a hook-and-loop fastening means 100, 105 to allow selective closing and securing of the upper opening 70 of the apparatus 10. This allows the respective straps 50 to be drawn tightly around the upper opening 70 until the periphery of the upper opening 70 abuts thereagainst the rope, twine, string, or the like that is supporting the carcass, thereby constricting access therein.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. A ventilated game bag, comprising:
   a bag comprising a primary portion and a secondary portion of an open-screen netting material each affixed thereto and an upper opening providing access to an inner compartment area therein, further comprising a front panel, a rear panel, a first side panel, a second side panel, and a base panel interconnected by a seaming means;
   a constricting means located on said bag, thereby constricting said upper opening; and,
   an opening means located on said bag, thereby providing access to said inner compartment area;
   wherein said bag accommodates a variety of different game carcasses;
   wherein said primary and secondary portions of netting material permits a flow of air through while preventing a variety of containments from entering therein;
   wherein said secondary portion of said netting material is located on an upper portion of said rear panel of said bag;
   wherein said primary portion of netting material is located on and completely covers said base panel;
   wherein said primary portion of said netting material continuously wraps about said lower portion of said bag and thereby covers a lower portion of said front and rear panels as well as a lower portion of said first and second side panels, respectively;
   wherein said opening means extends away from said upper opening and terminates prior to reaching said primary portion of netting material;
   wherein said opening means is attached to said front panel; and,
   wherein said opening means is spaced from said rear panel, said first side panel, said second side panel and said base panel.

2. The bag of claim 1, wherein said secondary portion of netting material located on said rear panel comprises a diamond shape approximately one-fifth (1/5) of a total area of said rear panel.

3. The bag of claim 1, wherein said netting material comprises a plurality of openings approximately one-sixteenth (1/16) of an inch square.

4. The bag of claim 1, wherein said constricting means comprises a plurality of straps.

5. The bag of claim 4, wherein said plurality of straps comprise a hook-and-loop fastener means on for securing said plurality of straps together when constricting said upper opening of said apparatus.

6. The bag of claim 1, wherein said bag further comprises:
   an inner face comprising a washable material; and,
   an outer face comprising a water-resistant material.

7. The bag of claim 1, wherein said inner compartment area is approximately nine-and-one-half (9½) feet long and approximately three (3) feet wide.

8. The bag of claim 1, wherein said apparatus is available in a camouflage design.

9. The bag of claim 1, wherein said apparatus is used to accommodate a variety of items that require said flow of air through said netting material.

10. The bag of claim 1, wherein said apparatus is foldable or collapsible for easy storage.

11. The bag of claim 1, wherein said opening means depends partially downward along said front panel from said upper opening.

12. The bag of claim 11, wherein said opening means comprises a zipper.

* * * * *